Figure 1:
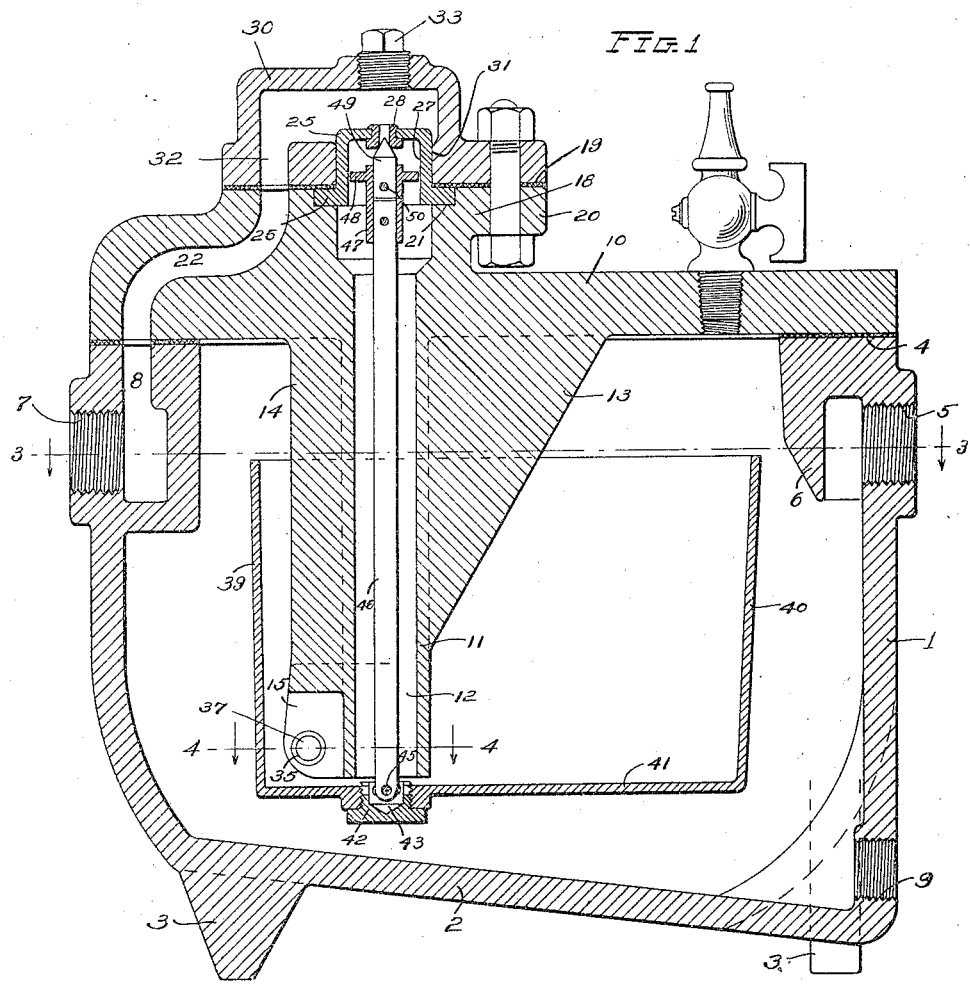

F. G. MARQUARDT & F. J. DELLINGER.
STEAM TRAP.
APPLICATION FILED APR. 15, 1912.

1,060,471.

Patented Apr. 29, 1913.
2 SHEETS—SHEET 1.

Witnesses:
Brennan B. West
Chas. C. Watt

Inventors
Frank G. Marquardt
and
Frank J. Dellinger
By Hill & Smith Attys.

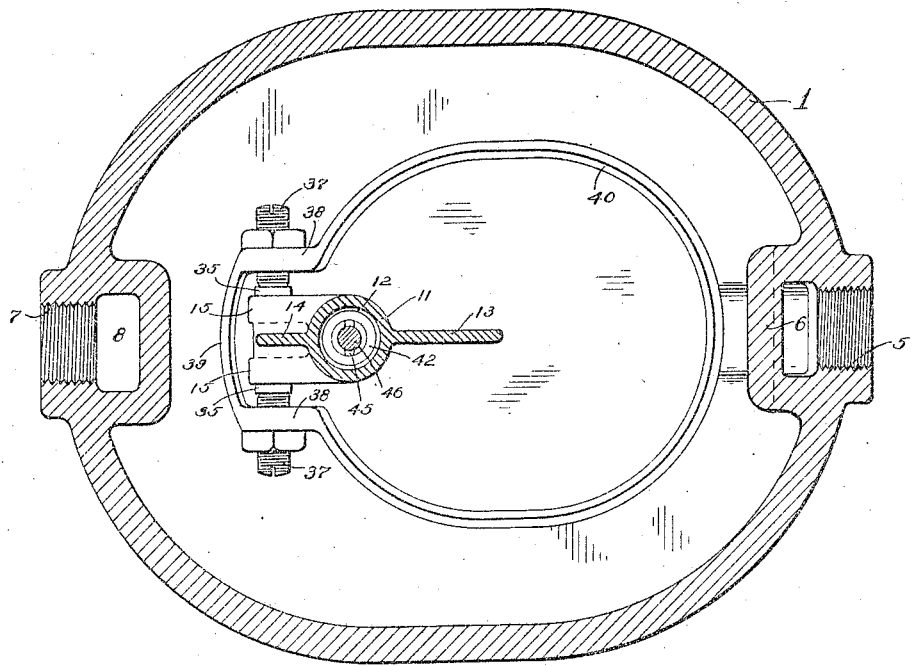
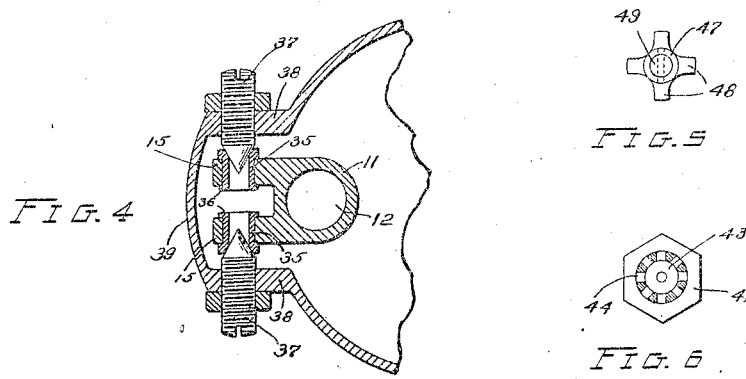

UNITED STATES PATENT OFFICE.

FRANK G. MARQUARDT AND FRANK J. DELLINGER, OF CLEVELAND, OHIO.

STEAM-TRAP.

1,060,471.   Specification of Letters Patent.   Patented Apr. 29, 1913.

Application filed April 15, 1912. Serial No. 690,982.

*To all whom it may concern:*

Be it known that we, FRANK G. MARQUARDT and FRANK J. DELLINGER, residing at Cleveland, in the county of Cuyahoga and State of Ohio, have invented a certain new and useful Improvement in Steam-Traps, of which the following is a full, clear, and exact description, reference being had to the accompanying drawings.

This invention relates to steamtraps or devices whereby water of condensation is automatically removed from a steam system without disturbing the pressure conditions existing within that system.

The objects of the invention are the provision of a device of this character of greater simplicity than any device heretofore in use for this purpose; the provision of a device wherein the outlet valve shall be more tightly closed during the normal operation of the trap than is the case in other devices; the provision of new and improved means for alining the fixed and movable members of the outlet valve and for permitting inspection of and repairs to said outlet valve; the provision of new and improved means for supporting the bucket or float; while further objects and advantages of our invention will become apparent in the course of the following description and claims.

Figure 2:
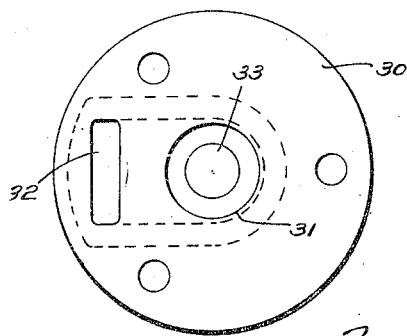

Generally speaking, our invention may be defined as consisting of the combinations of elements recited in the claims hereto annexed and illustrated in the drawings accompanying and forming part of this application, wherein:

Figure 1 represents a vertical longitudinal, cross-sectional, view through the center of a trap constructed in accordance with our invention; Fig. 2 is a bottom view of the cap or valve bonnet; Fig. 3 is a horizontal cross-sectional view taken on the line 3—3 of Fig. 1 and looking downwardly; Fig. 4 is a detail cross-sectional view taken on the line 4—4 of Fig. 1 looking downwardly; Fig. 5 is an end view of the movable member of the valve; and Fig. 6 is a transverse cross-sectional view through the nut whereby the valve stem is articulated to the bucket or float.

Describing the parts by reference characters, 1 represents the body of our improved trap, the same being preferably formed as an oval casting having a slanting bottom 2, supporting feet 3, and flat top 4. Formed in one of the side walls adjacent to the top of the body is an inlet aperture 5, threaded or otherwise adapted for the reception of an inlet pipe (not shown) and preferably covered by a shield 6 whereby the entering fluid is prevented from being injected directly into the bucket or float. The side wall of the body is also formed with an outlet aperture 7 likewise threaded or otherwise formed for the reception of a suitable discharge pipe, the inner end of said outlet aperture communicating with a recess 8 formed in the body wall and opening through the top 4 thereof. The body is also formed at its lowermost point with an aperture 9 for the reception of a drain cock or mud valve.

10 represents the top or cover of the trap which preferably consists of a cast metal plate adapted to be secured upon the top 4 so as to close said body and having its lower surface formed with a downwardly projecting bracket 11 pierced by a vertical bore 12 through which the collected water may be discharged. This bracket is preferably formed with integral ribs or fins 13 and 14 for its greater stiffness, the lower end of the latter fin preferably being divided into a pair of spaced ears 15—15 whose general direction is preferably substantially parallel to the major axis of the trap body. The top of the cover is formed with a raised upwardly facing, seating portion 18 having a substantially flat top 19 and slotted ears 20, the lower surfaces of which are spaced from the top of the plate 10 sufficiently to permit the insertion of a bolt head as shown in Fig. 1. The upper end of the bore 12 opens through the flat surface 19 and is at this point surrounded by a recess or counterbore 21, the center of which preferably coincides with the axis of the bore 12. The cover is also formed with a passageway 22 one end of which opens through the surface 19 at a point removed from the bore 12, and the other end of which opens through the lower surface of the cover at a point which shall cause it to register with the recess 8 when the cover is secured in place.

Secured above the upper end of the bore 12 is the stationary member 25 of the outlet valve, said member being generally cup shaped and having a flange or rim 26 adapted to fit closely in the recess or counterbore 21, and also having a cylindrical interior 27 substantially concentric with the bore 12, The bottom of this cup shaped member is formed with a central aperture in which is secured in any suitable manner as by upsetting or spinning, the seating member 28 of the outlet valve. Secured to the upper surface 19 of the seating portion 18 is the valve cap or bonnet 30, which consists of a hollow casting having a central bore 31 adapted to receive the upwardly projecting portion of the valve member 25 and also having a port 32 adapted to register with the upper end of the passageway 22. The thickness of the flange 26 is such as to cause the fixed member to be clamped rigidly in place when the valve bonnet is secured to the cover. The wall of the bonnet opposite the valve seat 28 is preferably apertured for the reception of a screw plug 33 which may not only be removed to permit the inspection of the valve, but will receive the impact of the discharging fluid and will be more easily replaceable than would cast parts.

Secured in each of the ears 15—15 upon a line substantially normal to the major axis of the trap body is a bearing sleeve 35, the inner ends of these sleeves being preferably upset as at 36 whereby they are retained in place and the outer ends being slightly flared or tapered for the reception of the conical inner ends of pivot pins 37—37. These pivot pins are threaded into the parallel sides 38—38 of a projection 39 formed at the end of an open topped oblong bucket 40. When this bucket is in a substantially horizontal position as illustrated in Fig. 1, the bottom 41 thereof lies closely adjacent to the lower end of the bracket 11 through which opens the lower end of the bore 12, and in the bucket bottom directly beneath the end of this bore is a nut 42. This nut is formed with a threaded portion adapted to enter the aperture in the bucket bottom and with a flange adapted to overlie the bucket bottom adjacent to said aperture, the threaded portion of the nut being hollowed or recessed as at 43 and pierced with a plurality of diametrical apertures 44, as shown in Figs. 1 and 6. A pivot pin 45 is inserted in that aperture which is most nearly parallel with the axis of the pins 37 and a valve stem 46 is articulated to this pin and extends upwardly through the bore 12. The upper end of this stem is received in a sleeve 47 the sides of which are provided with spaced laterally projecting arms 48, the ends of which engage the cylindrical surface 27 of the valve member 25. The upper end of the sleeve 47 receives the movable member 49 of the valve which is removably secured therein by a pin 50 or other convenient means.

Supposing the bucket 40 to be substantially empty and the body 1 to be partly filled with liquid, it is obvious that the buoyancy of the bucket will maintain the outlet valve closed. As the water level in the body rises by the addition of liquid thereto from the inlet pipe, a time will come when the same will overflow into the bucket whereupon the latter will fall and open the outlet valve so as to permit the water in the bucket to be ejected through the bore 12, port 32, passageway 22, etc., by the pressure of the steam. This discharging action will continue until the liquid in the trap body has been drawn down to the level of the lowest point of the rim of the depressed bucket and for a sufficient time after that to lighten the bucket so that its buoyancy will cause it to rise and reseat the valve. This reseating action occurs before the water inside of the bucket has been drawn down sufficiently to uncover the lower end of the bracket 11. The lower end of the bore 12 is therefore always covered by a water seal and the scouring or erosion of the valve by the passage of a mixture of liquid and vapor is prevented.

The advantages derived from pivoting the bucket directly to the lower end of the discharge pipe are numerous. The decrease in the distance of the pivot from the end of the discharge bore 12 causes the bucket to move away from said bore a smaller amount when the same is depressed, even though the angle of depression of the bucket should remain the same, thus effecting the sealing of the discharge valve with a smaller amount of water in the bucket; the small distance between the bucket pivots and the valve stem causes the force exerted upon the stem by the buoyancy of the bucket to be greater than would otherwise be possible and so tends to prevent leakage through the valve; the combination of the discharge pipe and bucket pivoting bracket into one member simplifies the construction; and the location of the pivots inside the bucket close to the discharge opening causes them to be kept clean and free from sediment or scale by reason of the rush of liquid therearound.

In case it be necessary to repair or renew the outlet valve it is merely necessary to remove the bonnet 30 whereupon the member 25 of the valve can be freely lifted out of its socket. The member 49 of the valve will thereupon be immediately accessible since it projects above the seat 19.

While we have necessarily described our invention in detail, we do not propose to be limited to such details except as the same may be positively included in the claims hereto annexed or may be rendered necessary by the prior state of the art.

Having thus described our invention, what we claim is:

1. In a steam trap, the combination with a receptacle having a cover, said cover having a discharge bore opening through its top surface, of a float pivoted within said receptacle, a valve stem articulated to said float and extending upwardly through said bore, a movable valve member secured to the upper end of said stem and having a guiding portion, a fixed valve member engaged in the upper end of said bore and adapted to be engaged by said movable valve member when said float is in raised position, said fixed member having a projection, and a bonnet secured to the top surface of said cover and engaging said projection, said bonnet having a passageway therethrough for the discharge of liquid.

2. In a steam trap, the combination with a receptacle having a cover, said cover having a downwardly projecting bracket and said bracket being formed with a bore extending from the lower end thereof to the top surface of the cover, of a pair of spaced ears carried by the lower end of said bracket, a horizontal sleeve secured in each of said ears, a bucket surrounding the lower end of said bracket and having a pivot pin threaded into each of its walls and having a conical end engaging one of said sleeves, the inner ends of said sleeves being spaced apart, a fixed valve member rigidly secured in said bore and having a seating portion, a valve stem articulated to said bucket and projecting into said bore, and a movable valve member secured to the upper end of said stem and adapted to engage said fixed valve member.

3. In a steam trap, the combination with a receptacle having a cover, said cover having a downwardly projecting bracket and said bracket being formed with a bore extending from the lower end thereof to the top surface of the cover, of a pair of opposed pivot sockets carried by the lower end of said bracket, a bucket surrounding the lower end of said bracket and having at one side a projection having substantially parallel walls, a pivot pin threaded into each of said walls and having a conical end engaging one of said sockets, a valve in said bore and a valve stem articulated to said bucket and governing said valve.

4. In a steam trap, the combination with a body and a cover for said body, said cover having an upwardly facing seating portion, there being a discharge bore in said cover opening through said upwardly facing seating portion and the upper end of said bore being recessed, of a fixed valve member having a flange adapted to fit in such recess and having a guiding portion, a valve bonnet adapted to be secured on said seating portion and to engage the upper side of said flange whereby said valve member is clamped in place, said bonnet having a discharge passageway formed therethrough, a vertically movable float for said body, a valve stem movable with said float and adapted to project through said bore, a guiding portion carried by said stem for engaging said first guiding portion, and a movable valve member carried by the upper end of said stem for engaging said fixed valve member when said float is raised.

5. In a steam trap, the combination, with a body and a cover for said body, said cover having an upwardly facing seating portion and a discharge bore opening through said seating portion, the upper end of said discharge bore being recessed, a fixed valve member having an annular flange adapted to fit in said recess and having a cylindrical interior and an annular seat, a bonnet adapted to be secured to said seating portion and to clamp said flange in the counterbore, said bonnet having a bore receiving said fixed valve member, a float movable within said body, a valve stem secured to said float and projecting into said discharge bore, a guide carried by said valve stem and engaging the cylindrical portion of said fixed valve member, and a movable valve member carried by said stem and adapted to engage said seat.

6. In a steam trap, the combination, with a body having a cover receiving top and a recess in its wall opening through said top, said recess communicating with an outlet aperture, and a cover secured to said body and having an upwardly facing seating portion and a passageway opening through said seating portion and communicating with said recess, said cover being also formed with a discharge bore opening through said seating portion at its upper end and spaced from said passageway, the upper end of said bore being counterbored, of a fixed valve member having a peripheral flange received in said counterbore and having an upwardly projecting interiorly cylindrical portion extending upwardly above said seating portion, a valve seat carried by said valve member at a point above said seating portion, a hollow bonnet having a bore receiving the upwardly projecting portion of said fixed valve member and a port registering with said passageway, said port and bore being in communication with the hollow interior of said bonnet, means securing said bonnet to said cover so as to clamp said flange in said recess, a float pivoted within said body, a stem articulated to said float and projecting through said discharge bore, a guide member carried by said stem and engaging the interior of said fixed valve member, and a movable valve member detachably connected to said stem and adapted to engage said valve seat.

7. In a steam trap, the combination, with a tiltable bucket having a threaded aperture in its bottom, of a nut having a threaded portion adapted to enter said aperture and a flat portion adapted to overlie the bottom of the bucket, the threaded portion of said nut being recessed and formed with a plurality of angularly spaced diametrical apertures, a pivot pin adapted to be received in that aperture which is most nearly parallel with the pivotal axis of the bucket; and a valve stem adapted to be carried by said pivot.

In testimony whereof, we hereunto affix our signatures in the presence of two witnesses.

FRANK G. MARQUARDT.
FRANK J. DELLINGER.

Witnesses:
HAROLD E. SMITH,
ALBERT H. BATES.